No. 739,228. PATENTED SEPT. 15, 1903.
J. M. SCHUTZ.
POWER FEEDER.
APPLICATION FILED MAY 10, 1900.
NO MODEL. 2 SHEETS—SHEET 1.

WITNESSES
J. Jensen
M. E. Gooley

INVENTOR
JOSEPH M. SCHUTZ
BY Paul C. Hawley
ATTORNEYS.

No. 739,228. PATENTED SEPT. 15, 1903.
J. M. SCHUTZ.
POWER FEEDER.
APPLICATION FILED MAY 10, 1900.
NO MODEL. 2 SHEETS—SHEET 2.

WITNESSES. INVENTOR.
JOSEPH M. SCHUTZ
BY Paul D. Hawley
ATTORNEYS.

No. 739,228. Patented September 15, 1903.

UNITED STATES PATENT OFFICE.

JOSEPH M. SCHUTZ, OF MINNEAPOLIS, MINNESOTA, ASSIGNOR TO SCHUTZ-O'NEILL COMPANY, OF MINNEAPOLIS, MINNESOTA, A CORPORATION OF MINNESOTA.

POWER-FEEDER.

SPECIFICATION forming part of Letters Patent No. 739,228, dated September 15, 1903.

Application filed May 10, 1900. Serial No. 16,115. (No model.)

*To all whom it may concern:*

Be it known that I, JOSEPH M. SCHUTZ, of the city of Minneapolis, county of Hennepin, State of Minnesota, have invented certain new and useful Improvements in Power-Feeders, of which the following is a specification.

This invention relates to means for feeding materials of various kinds to machines wherein the material is to be treated.

The object of the invention is to provide a feeder that will be positive, exact, and regular in its operation and which will be variable at will while running.

A further object of the invention is to provide a feeder which may be used for delivering practically any sort of material to its associated machine and which will be of the most simple construction, thoroughly durable, and easy running.

Another object of the invention is to provide a combined feeder and magnetic separator.

The invention consists in a hopper, in combination with a swinging bottom therefor, and a driving mechanism connected with said swinging bottom, whereby the bottom is oscillated and reciprocated beneath the hopper to regularly discharge the contents thereof; and, further, the invention consists in particular constructions and combinations of parts, all as hereinafter described, and particularly pointed out in the claims.

The invention will be more readily understood by reference to the accompanying drawings, in which—

Figure 1:
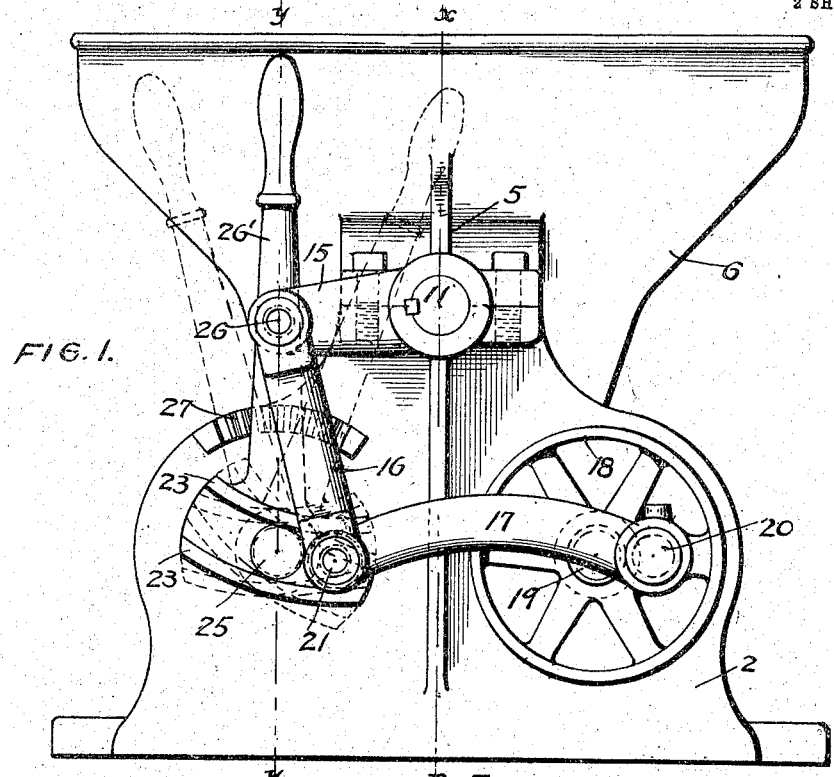
Figure 2:
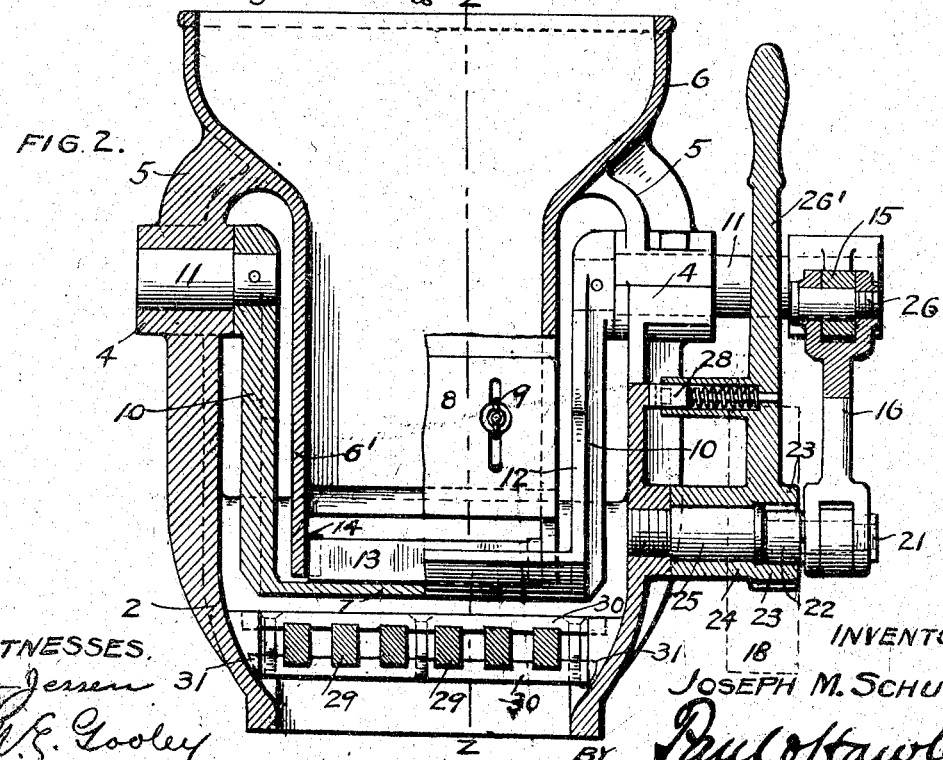
Figure 3:
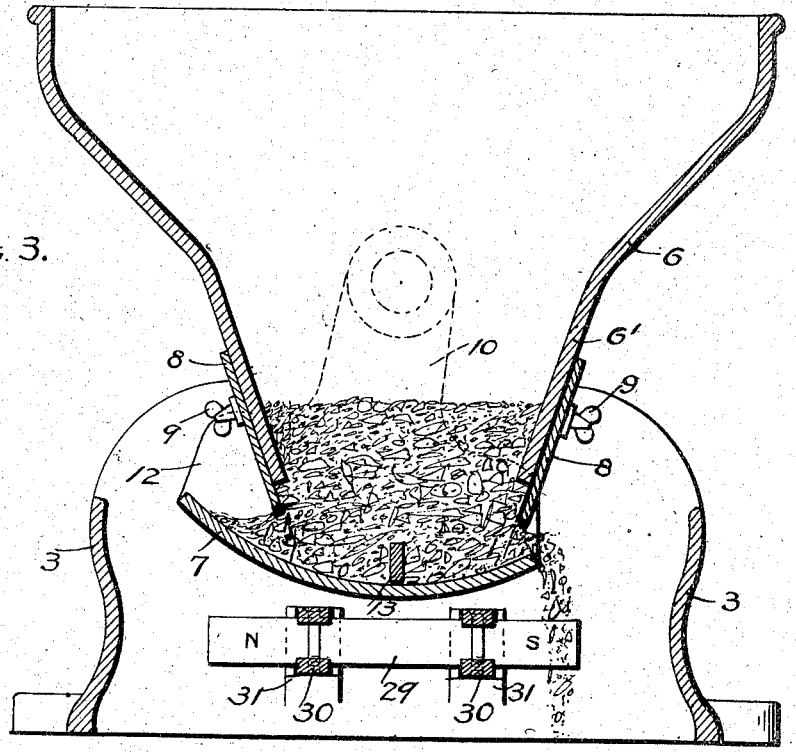
Figure 4:
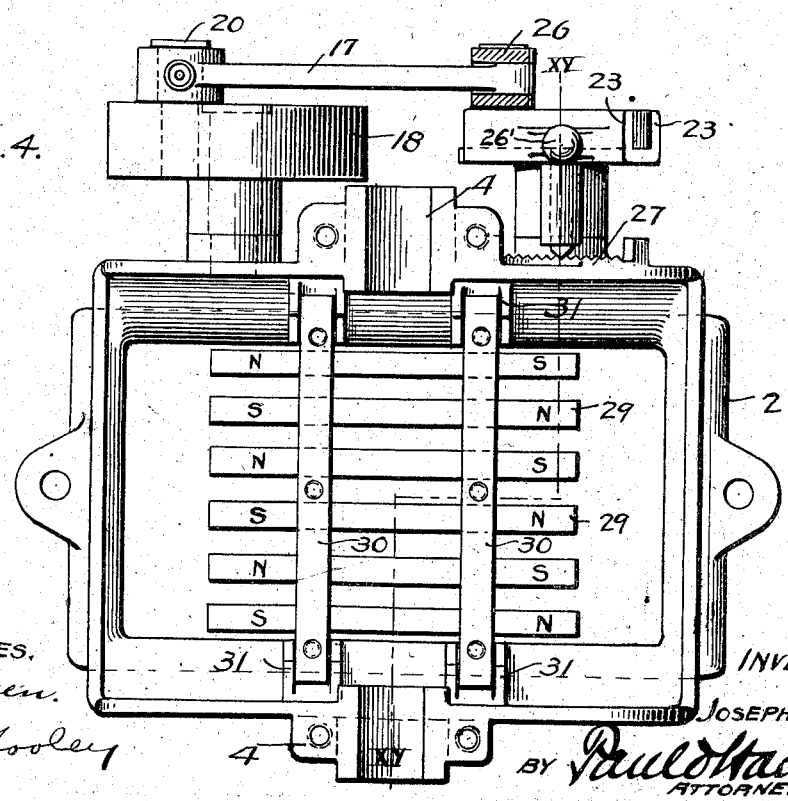

Figure 1 is a side elevation of a feeder embodying my invention. Fig. 2 is a vertical section thereof, one half on the line $x$ $x$ of Fig. 1 and one half on the line $y$ $y$ of Fig. 1, also indicated by the irregular section-line $xy$ $xy$ of Fig. 4. Fig. 3 is a vertical section on the line $x$ $x$ of Fig. 1. Fig. 4 is a plan view of the feeder-base with the hopper and oscillating bottom removed.

As shown in the drawings, 2 represents the base of the machine. This usually rests on the top of the machine to which the material is to be fed. The ends of the base are partially closed by walls 3, and the base contains the magnetic separator, hereinafter described. The top of the base is open, and at the tops of the sides thereof are the bearings 4 4, upon opposite sides. The lower parts of these bearings are integral with the base. The upper parts are formed in the brackets 5, that depend from the sides of the hopper 6. The hopper extends down into the base a considerable distance below the bearings 4, and the bottom of the hopper is open.

Beneath the hopper and in the base is the swinging or oscillating feed-board or bottom 7, of greater length than the opening at the lower end of the hopper, so that when the bottom is in the middle position directly beneath the hopper the material will not spill over the ends or edges of the bottom 7. The bottom or feed-board 7 is curved in the arc of a circle having the center of the bearings 4 as its center. The bottom 7 is, as shown, slightly below the lower edges of the hopper, leaving quite a large discharge-opening at each end, which opening may be increased or decreased by adjusting the end plates or gates 8 8 upon the hopper and held by thumb-screws 9. The curved bottom 7 is supported by the depending arms 10, secured to the inner end of the shaft-sections 11 11, that are in the bearings 4. The arms 10 are provided with the extended wings or flanges 12, which prevent the spilling of the material from the sides of the bottom 7.

As shown in the drawings, I prefer to make the curved bottom 7 and the arms 10 integral in a single casting, which serves to join the sections of the shaft 11 and avoids the use of bolts or screws which might get loose.

13 represents a cross-bar or low partition provided in the bottom of the hopper. The bar 13 is held by lugs 14 upon the inner sides of the downwardly-extended sides 6' of the hopper, and the bar may rest upon the top of the curved bottom 7. One section of the shaft 11 is longer than the other and carries the crank-arm 15, by which the bottom is oscillated. For operating the crank-arm, shaft, and bottom 7 I provide the link 16, the connecting-rods 17, and the crank wheel or disk 18. Said wheel 18 is driven at a suitable speed. It is mounted upon a stud 19, extending from the side of the base 2, and the wheel carries the crank-pin 20, on which the end of the connecting-rod 17 is journaled to be moved back and forth thereby. The pivot 21 between the parts 16 and 17 is provided with an inwardly-projecting end, preferably a roller 22, that plays between the parallel flanges 23 23 of the movable cam 24. This cam is carried upon the stud 25, extending from the base 2, and is provided with a hand-lever 26', by which the angle of the cam may be adjusted with respect to a line drawn through the center of the studs 19 and 25. The cam surfaces or flanges 23 are curved in arcs the radii of which correspond to the length of the link 16, so that the upper pivot 26 of the link 16 will be concentric with the cam-surfaces when the cam is moved so that its surfaces most nearly approach to parallels with the line between the centers of the studs 19 and 25 of the driving-wheel and cam, respectively, or, in other words, are substantially included in a right angle that includes the centers 19, 25, and 26. The side of the base 2 is provided with roughened or ratchet surface 27, with which a spring-button 28 on the lever 26 engages to lock said lever and the cam in any desired position. This surface is of such extent and arrangement as to permit the cam to be thrown to and locked in any of the positions from a full stop to the maximum throw.

The magnetic separator is arranged directly beneath the bottom of the hopper and within the base 2, and it is made up of a number of alternatively-placed permanent magnets 29 29. These are arranged at convenient distances apart and are held between brass bars 30, the ends of which rest in seats 31, provided therefor in the sides of the base. The bars are of about the same length as the bottom 7 and of greater length than the bottom of the hopper, and all of the material that falls from the ends of the bottom 7 must fall upon the ends of the magnets.

The operation of the machine is as follows: The nature of the material to be handled governs the adjustment of the gates 8. If the material is fine, these gates are dropped quite close to the swinging bottom 7, while if the material is coarse the gates are raised. The hopper being filled with material the same will spread out somewhat on the bottom 7, and when said bottom is reciprocated its ends will be alternately withdrawn from beneath the material. In this manner a limited amount of the material is dropped into the space beneath the swinging bottom at each stroke of the swinging bottom. As the material falls upon the magnetic separator any particles of magnetic material will adhere thereto and will be prevented from passing into the associated machine. The grating of bar-magnets rests in the seats 31 of the base, being held by its own weight, and may be removed at any time through the top of the base without disturbing the hopper. Where the kind and condition of the material to be treated and where the capacity of the associated machine is constant, the bottom 7 may be operated at a fixed speed and with a fixed length of stroke; but these conditions are unusual, and it is therefore necessary to provide means for varying the stroke of the bottom in order to vary the feed. This is accomplished and the advantage of a constant rotative speed retained by the employment of the regulable operating mechanism. The wheel or disk 18 is driven in any suitable manner, usually by a belt extending from some part of the machine with which the feeder is associated. As this wheel is rotated the connecting-rod is driven back and forth in the cam. If this cam is inclined with respect to the connecting-rod, the end of the rod will be alternately lifted and depressed. This movement is communicated to the arm 15, shaft 11, and bottom 7 through the link 16. When the cam is substantially parallel with the connecting-rod 17, the end thereof will merely play back and forth in an arc that is concentric with the upper end of the link 16, so that the link will swing from side to side without moving the crank-arm 15 or the bottom 7. The hand-lever 26 may be thrown into the left-hand dotted position, Fig. 1, and the movement of the swinging bottom will be stopped, while the wheel 18 continues to run. As the hand-lever and the cam are moved from the stationary left-hand position the cam will be given an angular position, and the swinging bottom or feed-board 7 will be set in motion, with the stroke corresponding to the degree of angularity of the cam. The maximum angle of the cam gives the maximum stroke to the bottom. I prefer that the maximum angle of the cam shall not exceed forty-five degrees. It is usually less. In order to avoid undue friction between the cam and the traveling pivot, I provide roller 22, serving as the slide-block therein.

When the machine is employed to feed very light material, the cross-bar or partition 13 may sometimes be omitted, as there is less tendency for the light material to carry with the swinging bottom.

A marked advantage of my invention lies in the fact that as the bottom 7 is curved and swings in an arc of a circle there is no tendency therein to lift the material in the hopper, resulting in a marked saving of power.

Another advantage that may be claimed for the machine is that there are no hidden bolts, screws, or rivets that can get loose and drop into the grinding or other machine.

Having thus described my invention, I claim as new and desire to secure by Letters Patent—

1. The combination of the hopper provided with the downwardly-extending brackets forming the tops of the journal-boxes, of the base forming the bottoms of said journal-boxes, the shafts working in said journal-boxes, and the curved bottom swinging under said hopper and attached to the inner ends of said shaft in the space between the hopper and base, substantially as described.

2. The combination with the hopper provided with the downwardly-extending brackets forming the tops of the journal-boxes, of the base forming the bottoms of said journal-boxes, the shafts working in said journal-boxes, the curved bottom swinging under said hopper, and the wings connecting the said bottom with the inner ends of said shafts and extending between the hopper and base, substantially as described.

3. The combination of the swinging bottom 7, the hopper 6, the base 2, formed with the seats 31 and the gratings, of magnets 29 removably held in said seats.

4. The combination with the base 2, the hopper 6, and the swinging bottom 7, of the pivotal supports 11 for said bottom, the crank-arm 15 connected to one of said supports, the link 16, the connecting-rod 17, and the throw-cam 24 for controlling the rocking of said bottom, substantially as described.

5. The combination with the base 2, the hopper 6 and the swinging bottom 7, of the pivotal support 11, for said bottom, the crank-arm 15 attached to one of said supports, the link 16, the connecting-rod 17, the cam 24, the roller 22 moving thereon, the lever 26' for moving said cam, and the ratchet-surface 27, and the spring-button 28 for retaining said lever in any adjusted position, substantially as described.

6. The combination with the hopper provided with downwardly-extending brackets forming the tops of the journal-boxes, and the base 2 forming the bottom of said journal-boxes, the shafts 11 working in said journal-boxes, the curved bottom 7, the wings 12 connecting said bottom to the inner ends of said shafts in the space between the hopper and base, the magnets located below said curved bottom, and means for moving the curved bottom over the magnets.

7. The combination of the base 2 with the hopper supported thereby, the curved bottom 7 swinging beneath said hopper, adjustable sides for said hopper, said hopper having lugs 14 and the partition 13 held between said lugs 14 and resting upon said curved bottom by which the weight of said partition 13 is carried, substantially as described.

In witness whereof I have hereunto set my hand at Minneapolis, Minnesota, this 5th day of May, 1900.

JOSEPH M. SCHUTZ.

In presence of—
C. G. HAWLEY,
M. E. GOOLEY.